US010060106B2

(12) United States Patent
Mills

(10) Patent No.: US 10,060,106 B2
(45) Date of Patent: Aug. 28, 2018

(54) CONTROL SYSTEM FOR A SHOWER

(71) Applicant: Bristan Group Limited, Staffordshire (GB)

(72) Inventor: Keith Peter Mills, Staffordshire (GB)

(73) Assignee: Bristan Group Limited, Staffordshire (GB)

( * ) Notice: Subject to any disclaimer, the term of this patent is extended or adjusted under 35 U.S.C. 154(b) by 184 days.

(21) Appl. No.: 14/712,611

(22) Filed: May 14, 2015

(65) Prior Publication Data

US 2015/0345119 A1    Dec. 3, 2015

(30) Foreign Application Priority Data

May 14, 2014 (GB) .................................. 1408542.7

(51) Int. Cl.
| | | |
|---|---|---|
| *E03C 1/04* | (2006.01) | |
| *E03C 1/05* | (2006.01) | |
| *B05B 7/04* | (2006.01) | |
| *B05B 1/30* | (2006.01) | |
| *G05D 23/185* | (2006.01) | |
| *E03C 1/02* | (2006.01) | |

(52) U.S. Cl.
CPC .............. *E03C 1/0408* (2013.01); *B05B 1/30* (2013.01); *B05B 7/0408* (2013.01); *E03C 1/055* (2013.01); *G05D 23/1858* (2013.01); *E03C 2001/026* (2013.01)

(58) Field of Classification Search
CPC ...... E03C 1/0408; E03C 1/0409; E03C 1/055; B05B 1/30; B05B 7/0408

USPC ............................................................. 4/601
See application file for complete search history.

(56) References Cited

U.S. PATENT DOCUMENTS

| | | | | |
|---|---|---|---|---|
| 5,414,879 | A | * | 5/1995 | Hiraishi .................... E03C 1/05 4/601 |
| 7,537,023 | B2 | | 5/2009 | Marty et al. |
| 8,413,952 | B2 | | 4/2013 | Lang et al. |
| 9,032,564 | B2 | * | 5/2015 | Reeder .................... E03C 1/055 4/601 |
| 2015/0068069 | A1 | * | 3/2015 | Tran ....................... H04B 1/385 340/693.1 |

FOREIGN PATENT DOCUMENTS

| | | |
|---|---|---|
| EP | 1601841 B1 | 11/2007 |
| JP | 2010287351 A | 12/2010 |
| JP | 2011043335 A | 3/2011 |
| WO | WO2009090197 A1 | 7/2009 |

* cited by examiner

*Primary Examiner* — Tuan N Nguyen
(74) *Attorney, Agent, or Firm* — Faegre Baker Daniels LLP

(57) ABSTRACT

According to the present invention there is provided a control system (20; 120) for a shower comprising a control lever (42; 142) having a changeable position for setting one or more water flow parameters, where the control lever (42; 142) includes a target (44). The control system (20; 120) further comprises a position sensor arranged to sense the position of the target (42; 142) and a controller (50) arranged to monitor the sensed position of the target (42; 142) and send a corresponding control signal to one or more valves (28; 128) to allow a pre-determined flow rate of water to pass.

21 Claims, 4 Drawing Sheets

CONTROL SYSTEM FOR A SHOWER

CROSS-REFERENCE TO RELATED APPLICATION

This applications claims priority to United Kingdom Patent Application No. GB1408542.7, filed on May 14, 2014, the disclosure of which is expressly incorporated by reference herein.

BACKGROUND OF THE DISCLOSURE

The present invention relates to shower systems and more particularly to control systems for controlling such shower systems.

Conventional shower systems include one or more nozzles for spraying water and a control valve in a shower enclosure. The control valve includes a control lever and a housing defining a chamber within which is situated a mixing cartridge. The housing has respective hot and cold water inlets and a mixed water outlet. The mixed water outlet is coupled to the or each nozzle. The cartridge is arranged so that movement of the control lever varies one or more water flow parameters.

Temperature is one example of a water flow parameter controlled by the cartridge. To control temperature, the control lever is rotated in the plane of the shower wall which configures the cartridge to vary the flow rate of hot and cold water passing through the cartridge thus controlling the temperature of the water exiting the mixed water outlet.

Flow rate through the nozzle is another flow control parameter. To control flow rate, the control lever is rotated to and away from the shower wall which configures the cartridge to allow a predetermined flow rate of water to exit the mixed water outlet.

The aforementioned shower systems are limited in that the flow parameters and control profiles that can be controlled using the control valve are fixed according to the type of cartridge used.

The present invention aims to overcome such problems and improve on the prior art.

SUMMARY OF THE DISCLOSURE

According to a first aspect of the present invention there is provided, a control system for a shower comprising a control handle the position of which can be changed for setting a water flow parameter, the control handle including a target, the control system further comprising a position sensor arranged to sense the position of the target and a controller arranged to monitor the sensed position of the target and send a corresponding control signal to a valve to effect control of the water flow parameter.

This allows for the parameter being controlled or the profile of the parameter being controlled to be changed by reprogramming the controller without needing to change the valve hardware.

The position sensor may include two or more capacitive sensors.

Capacitive sensors are reliable, effective, and flexible position sensors in comparison to other types for example simple switches, purely mechanical devices or rheostat devices.

The two or more capacitive sensors may each include a capacitive plate.

The capacitive plate preferably has an area from 30 mm$^2$ to 200 mm$^2$. This range allows for sufficient quality capacitance readings to be taken.

The capacitive plates each comprise a copper pad. Copper is more desirable for this application than other materials because it is simple and cheap to use.

The copper pads may be formed on a PCB. This is a simple way of providing the capacitive plates since copper already exists on a PCB prior to etching the copper to form the PCB circuitry.

The capacitive plates are preferably of equal size and/or shape. This allows for the readings from each capacitive plate to be comparable.

The PCB may be arcuate, in such a case, and the control handle is a lever which is rotatable. Such an arrangement provides for a compact design.

Each capacitive plate may comprise a dielectric coating. The dielectric coating improves stability and repeatability of the capacitance readings taken from the capacitive plates.

The dielectric coating comprises a layer of PVC. Insulating properties are particularly important in the present setting due to the potentially corrosive environment in which the control system is used.

The dielectric coating has a thickness from 0.1 mm to 0.3 mm. Below this range and the layer may risk being removed completely when if contacted thus rendering the insulating layer non-effective. A layer thicker than 0.3 mm would be less desirable for dielectric purposes.

The target may comprise a metallic material. Metal is more detectable than other materials.

The target may comprise stainless steel.

The target may have a thickness from 0.5 mm to 2 mm. Stainless steel strips of a lower thickness are harder to obtain in mass quantities. Stainless steel strips of a higher thickness increase cost for minimal extra benefit.

The control system may further comprise a housing including a body defining a chamber for encasing the other components of the control system, the housing further comprising the control handle sealingly coupled to the body such that the housing is water tight.

A water tight housing is particularly important considering the wet environment in which the control system operates.

According to a second aspect of the present invention there is provided a shower system comprising a water supply line, a valve positioned on the water supply line, a shower nozzle coupled to the water supply line downstream of the or each valve, and the control system according to the first aspect.

This allows for the parameter being controlled or the profile of the parameter being controlled to be changed by reprogramming the controller without needing to change the hardware.

The or each valve may be a proportional solenoid valve. Proportional solenoid valves are reliable components which are effective at allowing graduated predetermined flow rates of water to pass.

The one or more valves may be arranged to allow an incremental flow rate of water to pass, wherein the incremental flow rate of water is between 0.5 liters per minute (lpm) and 3 liters per minute (lpm).

The incremental flow rate of water may be between 0.5 lpm and 1 lpm. This low range allows for a smooth linear change in flow parameter.

Alternatively, the incremental quantity of water is between 1 lpm and 3 lpm. This high range provides more of a step change in flow parameter.

According to a third aspect of the present invention, there is provided a method of controlling a shower system comprising the steps of;

providing a control system according to a first aspect of the invention;

sending an excitation signal to the position sensor;

monitoring a return signal from the position sensor, the return signals indicative of the position of the target;

the controller executing a program to produce a control signal according to the position of the target;

sending the control signal to a valve to allow a predetermined flow rate of water to pass.

The water flow parameter may be selected from the list of temperature and flow rate.

The flow parameter may be changeable according to a pre-determined profile selected from the list of a step change, a linear change, an exponential change.

A flow rate of water allowed to pass one or more of the valves may be between 0.5 and 10 lpm.

Where the profile is a step change, the incremental flow rate of water allowed to pass one or more of the valves may be between 1 lpm and 3 lpm for each step.

Where the profile is a linear change, the flow rate still changes in a step function but the incremental flow rate of water allowed to pass one or more of the valves may be between 0.5 and 1 lpm, which feels like a linear progression to the user of the shower.

The position sensor may comprise two or more capacitive sensors and the step of monitoring the or each return signal may include the step of monitoring a capacitance from each capacitive sensor.

The two or more capacitive sensors may each include a capacitive plate and the step of measuring the capacitance may include the step of sending an excitation signal to a first of the capacitive plates and measuring the capacitance through a second of the capacitive plates.

The step of measuring the capacitance may include the step of sending a further excitation signal to a second of the capacitive plates and measuring the capacitance across the first of the capacitive plates. This provides for more accurate monitoring of the position of the target than measuring the capacitance at one plate only.

The excitation signal may be from 1.5V to 2V. Such a voltage is sufficient to obtain accurate target position readings and minimizes power consumption.

BRIEF DESCRIPTION OF DRAWINGS

The present invention is best described with reference to the accompanying figures, in which.

DETAILED DESCRIPTION OF THE DRAWINGS

Figure 1:
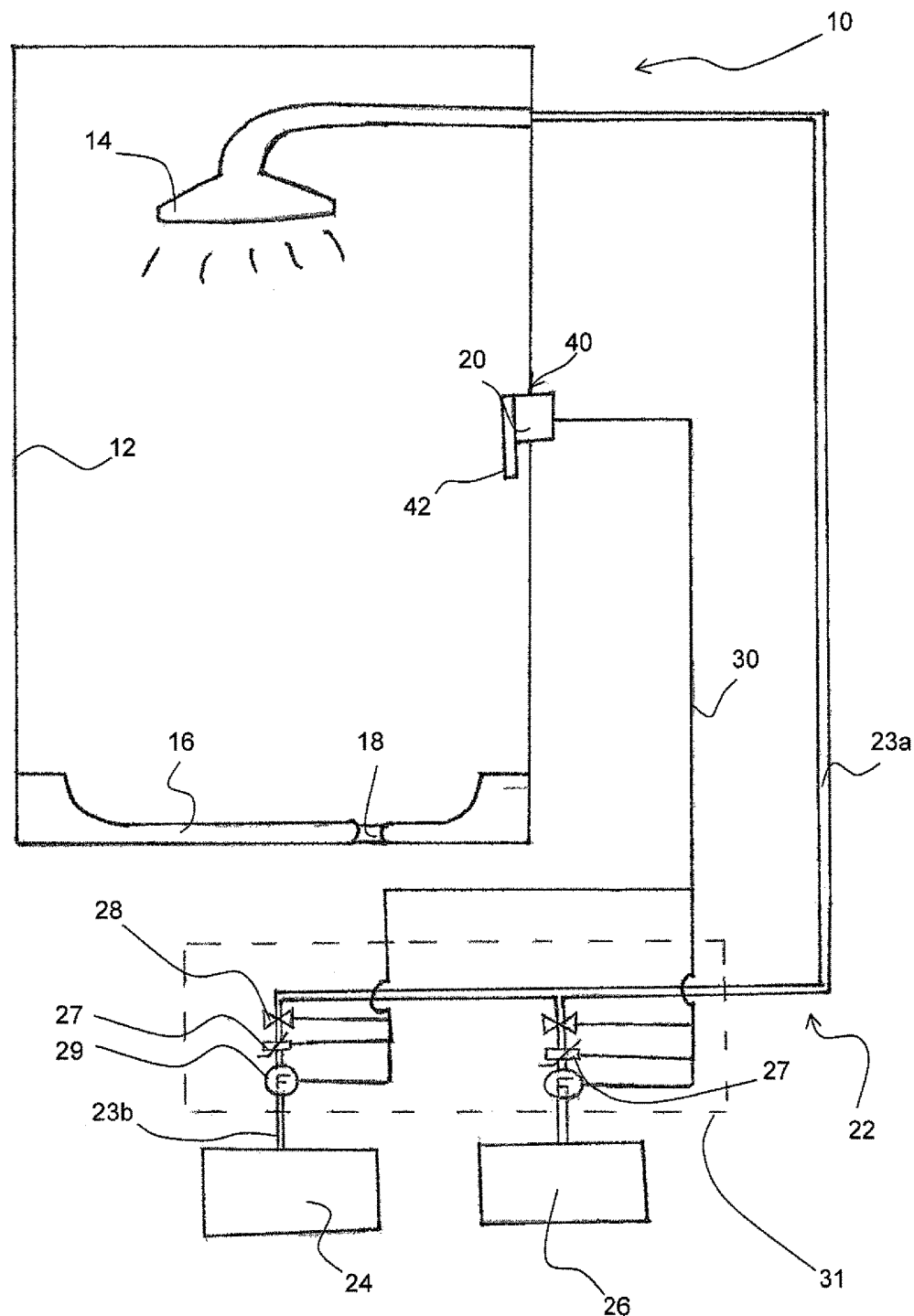
FIG. 1 is a schematic view of a shower system according to an embodiment the present invention.

With reference to FIG. 1, a shower system 10 includes respective hot and cold water supplies 24, 26 and a network of water pipes 22. The network of pipes includes hot and cold water branch pipes 23b coupled to respective hot and cold water supplies 24, 26. The hot and cold branch pipes 23b each includes a proportional solenoid valve 28 a thermistor 27, and a flow meter 29. A mixed water pipe 23a is coupled to both branch pipes 23b downstream of the valves 28. The mixed water pipe 23a terminates at an end coupled to a nozzle 14.

The nozzle 14 together with a basin 16, a control system 20, are enclosed in a shower enclosure 12 which collectively could form part of the shower system 10. The basin 16 has a drain hole 18.

A cable or wireless link 30 links each of the valves 28 to the control system 20. The overall mixing valve is powered by a mains power supply. The valves 28, the thermistors 27 and the flow meters 29 are housed in a case 31.

Figure 2:
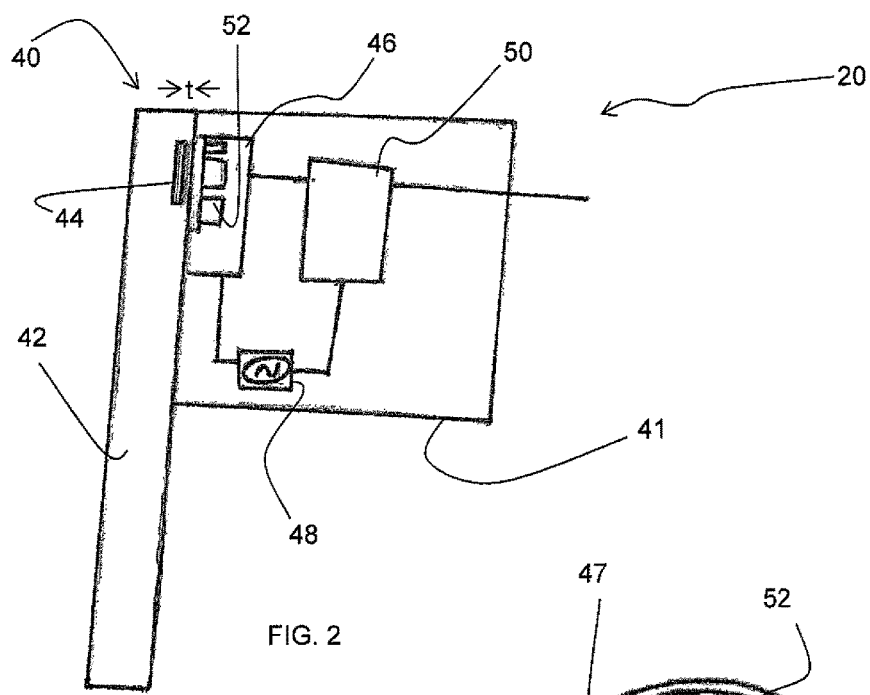
FIG. 2 is a side schematic view of a shower control system from FIG. 1.
Figure 3:
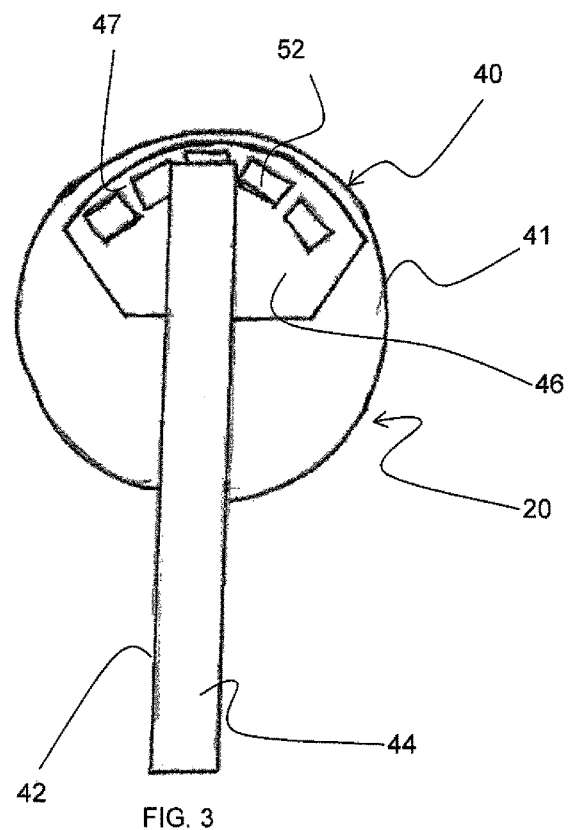
FIG. 3 is a front schematic view of the shower control system from FIG. 2.

With reference to FIGS. 2 and 3, the control system 20 comprises a control handle or lever 42 which includes a target 44, a PCB 46, a power supply 48, and a controller 50. The control system 20 further comprises a housing 40. The housing comprises a body 41 defining a chamber for encasing the other components of the control system 20 therein. The housing further comprises a control lever 42 sealingly coupled to the body 41. The housing 40 is water tight. The housing 40, including both the body 41 and the control lever 42, is made from a plastics material so as to form an insulating shroud. The control lever 42 is rotatable relative to the body 41. The PCB 46 has a fixed position within the body 41 so the control lever 42 is also rotatable relative to the PCB 46.

The target 44 is in the form of a strip and is embedded in the control lever 42. The target 44 is made from stainless steel. The target 44 is oriented to extend longitudinally within the control lever 42, albeit localized in the vicinity of the PCB. The target 44 has a thickness, t, of about 0.9 mm. In fact, the thickness, t, of the target 44 may be between 0.5 mm to 2 mm depending on material availability since stainless steel strip metal of a lower thickness is difficult to obtain in large quantities and thicker strips are more expensive with minimal extra benefit.

The PCB 46, the power supply 48, and the controller 50 are encased within the chamber defined by the body 41. The PCB 46 is situated at the front of the body 41 in the vicinity of the control lever 42. The PCB 46 is coplanar with the rotation in which the control lever 42 rotates. The PCB 46 has an arcuate portion 47 at the top. Five copper pads 52 are formed on the PCB 46. The copper pads 52 each form a capacitive plate. The capacitive plates each form a capacitive sensor. The capacitive sensors are grouped together to provide a position sensor. The position sensor is arranged to sense the position of the target 44.

The copper pads 52 are arranged in an arc formation. The copper pads 52 are generally square and flat in shape. The cross sectional area of the copper pads is between 30 and 200 mm'. All of the copper pads 52 are of equal size and shape in order to homogenize the capacitance reading from each plate in use. The spacing between adjacent plates 52 is such that the capacitive target 44 bridges at least two of the pads 52 at any one time throughout rotation of the control lever 42.

A layer of PVC is applied to the outer surface of the pads 52. The PVC layer is 0.1 to 0.3 mm thick. The PVC layer is preferably 0.2 mm thick. The PVC layer acts as a dielectric coating. The PVC layer also acts to protect the copper pads 52 from corrosion since copper is prone to corrosion when exposed to water.

The battery pack 48 provides electrical power to the PCB and the controller 50. The power supply 48 is a battery pack. The battery pack includes one or more batteries providing a total of 3V (AC).

Figure 4:
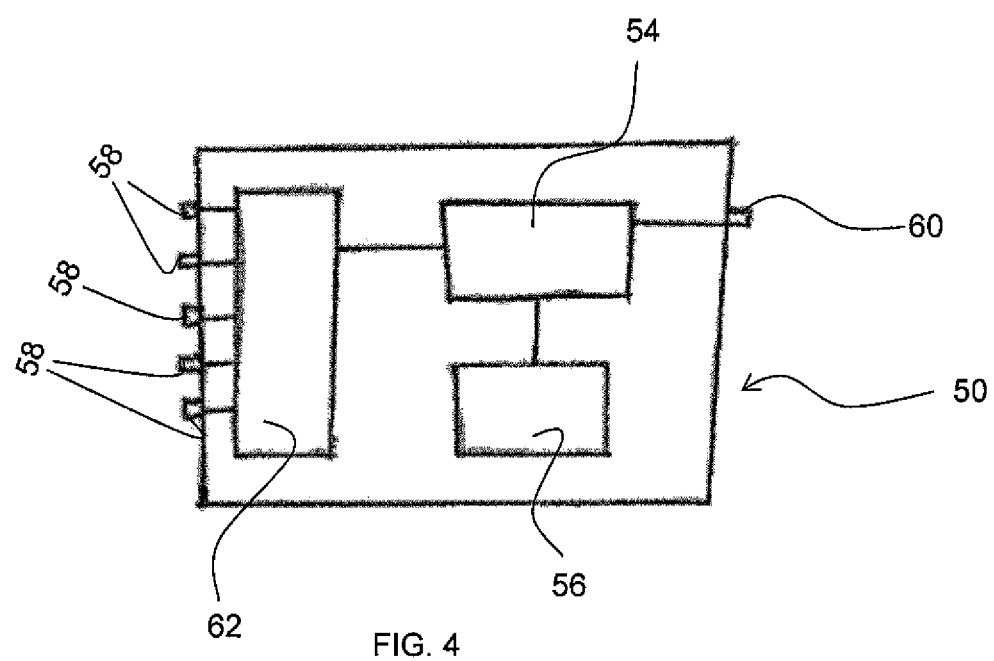
FIG. 4 is a block diagram of the controller from the shower control system from FIG. 2.

With reference to FIG. 4, the controller 50 includes a processor 54, a memory unit 56, five input terminals 58 and an output terminal 60. The controller 50 is a microcontroller. Each input terminal 58 is communicatively linked to a different copper pad 52. In this way the input terminals 58 are linked to the position sensor. The controller also includes an inbuilt analogue to digital converter (ADC) 62. The alternative would be to provide individual ADC and controller units however the inbuilt ADC is more compact. The memory unit 56 is a non-transitory memory unit. A programme is loaded into the memory unit 56 and arranged to be executed by the processor 54. The output terminal 60 is connected to the network of wires 30. Via the network of wires, the output terminal, and thus the controller 50, is coupled to each valve 28.

With reference again to FIGS. 1 to 4, in-operation, periodic excitation signals are sent alternately to each of the pads 52. Specifically, a first pad 52 experiences an excitation signal while the other four pads remain unexcited. In this way each pad 52 acts as an electrode or a capacitive plate. A return signal from each of the four unexcited pads 52 is indicative of the sensed capacitance. This capacitance reading is affected by the locality of the target 44 since the metallic strip affects the electric field created around the pads 52. The excitation signals are between 1.5-2V (AC). The cycle continues by sending an excitation signal to the next (the second) of the pads 52 while the first and third to fifth pads 52 remain unexcited. The return signal is measured from each of the four unexcited pads 52. Each of the first to fifth pads is excited in turn. This excitation cycle continues periodically.

It will be appreciated that the number of pads 52 is variable and not limited to five. The minimum number of copper pads 52 is two in order to measure the relative capacitance from the return signals of each pad 52. Also the size and shape of the pads 52 may change bearing in mind that the size and shape of each capacitive plate dictates the plate's capacitance sensitivity. The size and shape of the pads 52 being equal allows for the same sensitivity to capacitance which allows for a more simple programme as described below. Varying the size and/or shape of the pads 52 is possible but would need to be taken into account by the programme.

The return signals are sent to the controller 50. The ADC 62 converts the AC return signals to DC equivalent return signals. The DC equivalent return signals are monitored by the programme to determine the sensed position of the target 44. The programme includes a look up table. The return signals are compared to values stored in the look-up table to produce a control signal. The control signal is based upon a positional setting of a valve 28. A control signal is sent to each of the valves 28. The valves 28 allow a predetermined flow rate of water to pass therethrough depending on its positional setting. As will be described by the examples below, the flow rate through the valves provides for a change in one or more water flow parameters at the exit of the nozzle 14.

The controlled water flow parameter is temperature and/or flow rate of water exiting the nozzle 14. Each will be described in an exemplary embodiment below.

Temperature

A user rotates the lever 42 clockwise to increase and anti-clockwise to decrease the water temperature exiting the nozzle 14. The user moves the control lever 42 to a desired temperature setting. The controller 50 detects the position of the target 44 by monitoring the return signals from the four unexcited capacitive plates. The programme determines the positional settings of the valve 28 located on the hot and cold water branch pipes 23b required to achieve the temperature corresponding to the position of the target 44. The programme includes a look-up table to achieve this. The controller 50 sends a corresponding control signal to the valves to allow a predetermined flow rate of hot and cold water to pass through into the mixed water pipe 23a so as to provide mixed water at the appropriate temperature.

The positional setting of each valve 28 is changeable to allow a predetermined incremental flow rate of water to pass. The incremental flow rate of water allowed to pass each valve 28 is between 0.5 and 10 lpm. The temperature is changeable according to a pre-determined profile selected from the list of a step change, a linear change, an exponential change. Where the desired profile is a step change, the flow rate of water allowed to pass one or more of the valves for each step is between 1 and 3 lpm. The corresponding relative change in hot and cold water flow through the respective valves results in a temperature change at the nozzle which a user would consider to be a step change. Where the desired profile is a linear change, the flow rate of water allowed to pass one or more of the valves is changeable between 0.5 and 1 lpm for each step. The corresponding relative change in hot and cold water flow through the respective valves results in a temperature change at the nozzle 14, while the water is already running, which a user would consider to be linear as opposed to a step change.

With reference again to FIG. 1, the thermistors 27 provide a temperature which can provide a feedback function for the controller to optimize the flow rate exiting each valve 28 depending on the actual temperature of the water from the hot and cold supplies. The flow meters 29 provide feedback information regarding the actual flow rate of water passing each valve 28 so that the valves can be adjusted accordingly.

Flow Rate

A user rotates the lever 42 clockwise to increase and anti-clockwise to decrease the water flow rate exiting the nozzle 14. The user moves the control lever 42 to a desired water flow rate setting. The controller 50 detects the position of the target 44 by monitoring the return signals from the four unexcited capacitive plates. The programme determines the positional setting of the valve 28 located on the mixed water pipe 23a required to achieve the water flow rate corresponding to the position of the target 44 preferably whilst maintaining a pre-set temperature. The programme includes a look-up table to achieve this. The controller 50 sends a corresponding control signal to the valves to allow a predetermined flow rate of mixed water to pass through to the shower nozzle 14. As with temperature control, the flow rate exiting the nozzle 14 is changeable according to a pre-determined profile selected from the list of a step change, a linear change, an exponential change. This is effected by the changes in flow through the valves being between 0.5 to 3 lpm, with changes between 0.5 to 1 lpm for a linear change and 1 to 3 lpm for a step change.

The feedback function provided for by the thermistors 27 and the flow meters 29 aids in optimizing the flow rate control in a similar way to the temperature control scenario.

A push button or touchscreen (not shown) may be provided on the shower control system 20. Said button/touch screen may be connected to the controller 50 and used to change between flow rate and temperature control.

Figure 5:
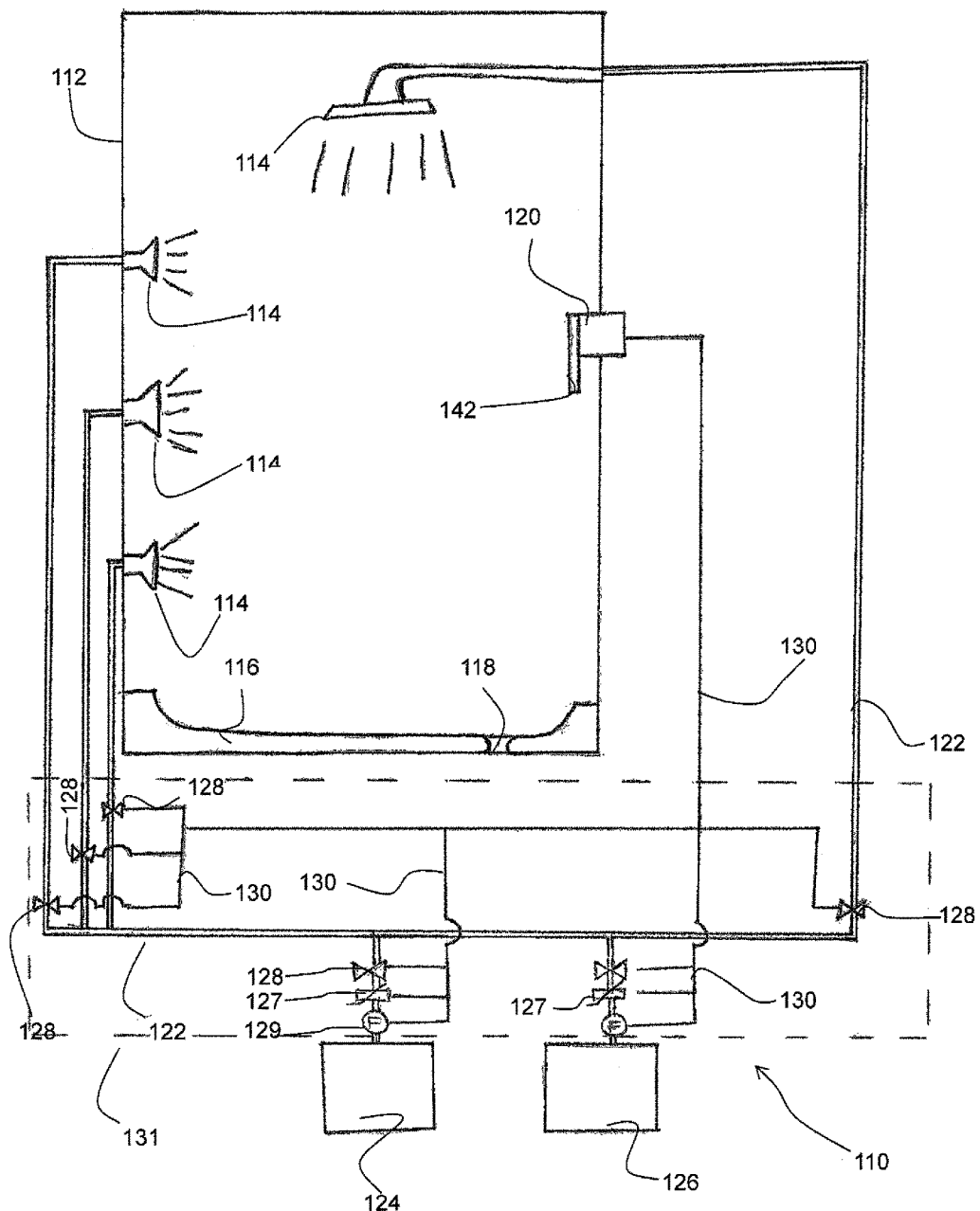
FIG. 5 is a similar view to FIG. 1 of a shower system according to a further embodiment of the present invention.

With reference to FIG. 5, in a further embodiment based on flow rate control, the shower system 110 includes two or more nozzles 114, for example four nozzles 114. A control lever 142 exists for each nozzle 114. The control system 120 operates largely in the same way as the control system 20 for the change in flow rate of one nozzle 14 by changing the positional setting of the valve 128 upstream of the respective nozzle 114.

It is possible for the programme to be reconfigured such that more than one water flow parameter could be controlled. For example, an additional control lever may be added to the control system; one for temperature control and the other for water flow rate control. The programme monitors return signals from all unexcited capacitive plates in the same way as described above. The valves 28 are controlled in the same way as described above. Either the control lever 42 or the additional control lever need not be rotatably mounted to the body 41 of the housing 40 but may be changeable in other ways such as linearly moveable. The pads 52 are reconfigured accordingly.

In a further embodiment, the water flow parameter can be pre-set such that a certain position of the target 44 corresponds to a flow rate and temperature at the nozzle 14. Such a pre-setting function allows for settings per shower user for example a flow-rate and temperature for a mother setting, a different temperature and flow rate for a dad setting and yet a different temperature and flow rate for a child setting. The temperature and/or flow rate can be stored as electronic data in the controller 50. When the target 44 is in a pre-set position, the control signal configures the valves 28 to provide a flow rate and temperature of water at the nozzle 14 as in the previous embodiments. One way in which to save the pre-set conditions is to move the lever 42 until a desired temperature and/or pressure is obtained then press a push button or an area of a touch screen to save the settings.

Although the invention has been described in detail with reference to certain preferred embodiments, variations and modifications exist within the spirit and scope of the invention as described and defined in the following claims.

The invention claimed is:

1. A control system for a shower comprising a control handle, the position of which can be changed for setting a water flow parameter, the control handle including a target comprising a metallic material, the control system further comprising a position sensor comprising two or more capacitive sensors arranged to sense the position of the target and a controller arranged to monitor the sensed position of the target and send a corresponding control signal to a valve to effect control of the water flow parameter.

2. The control system of claim 1 wherein the two or more capacitive sensors each include a capacitive plate.

3. The control system of claim 2 wherein the capacitive plate has an area from 30 mm$^2$ to 200 mm$^2$.

4. The control system of claim 3 wherein the capacitive plates comprise copper pads formed on a printed circuit board.

5. The control system of claim 4 wherein the printed circuit board is arcuate and the control handle is rotatable.

6. The control system of claim 2 wherein the capacitive plates are of equal size or shape.

7. The control system of claim 2 wherein each capacitive plate comprises a dielectric coating.

8. The control system of claim 7, wherein the dielectric coating comprises polyvinyl chloride (PVC).

9. The control system of claim 1, wherein the target comprises stainless steel.

10. The control system of claim 1 further comprising a housing including a body defining a chamber for encasing the other components of the control system, the housing further comprising the control handle sealingly coupled to the body such that the housing is water tight.

11. A control system according to claim 1, in which there is a spacing between each two of the two or more capacitive sensors and in which the spacing between any two adjacent capacitive sensors is such that the metallic material bridges the spacing at any time during operation.

12. A shower system comprising: one or more pipes; one or more valves positioned on the pipes; one or more shower nozzles coupled to the one or more pipes downstream of the one or more valves; and a control system including a control handle, the position of which can be changed for setting a water flow parameter, the control handle including a target comprising a metallic material, the control system further including a position sensor comprising two or more capacitive sensors arranged to sense the position of the target and a controller arranged to monitor the sensed position of the target and send a corresponding control signal to a valve to effect control of the water flow parameter.

13. The shower system of claim 12 wherein the one or more valves each comprises a proportional solenoid valve.

14. The shower system of claim 13 wherein the one or more valves are each arranged to allow an incremental flow rate of water to pass, wherein the incremental flow rate of water is between 0.5 lpm and 3 lpm.

15. A method of controlling a shower system comprising the steps of;
providing a control system including a control handle, the position of which can be changed for setting a water flow parameter, the control handle including a target comprising a metallic material, the control system further including a position sensor comprising two or more capacitive sensors arranged to sense the position of the target and a controller arranged to monitor the sensed position of the target and send a corresponding control signal to a valve to effect control of the water flow parameter;
sending an excitation signal to the position sensor;
monitoring a return signal from the position sensor, the return signal indicative of the position of the target;
the controller executing a program to produce a control signal according to the position of the target; and
sending the control signal to a valve to allow a predetermined flow rate of water to pass.

16. The method of claim 15 wherein the water flow parameter is at least one of temperature and flow rate.

17. The method of claim 16 wherein the flow parameter is changeable according to a pre-determined profile selected from at least one of a step change, a linear change, and an exponential change.

18. The method of claim 15 wherein a flow rate of water allowed to pass one or more of the valves is between 0.5 lpm and 10 lpm.

19. The method of claim 15 where the step of monitoring the return signal includes the step of monitoring a capacitance from each capacitive sensor.

20. The method of claim 19 wherein the two or more capacitive sensors each include a capacitive plate and the step of measuring the capacitance includes the step of sending an excitation signal to a first of the capacitive plates and measuring the capacitance through a second of the capacitive plates.

21. The method of claim 20 wherein the step of measuring the capacitance includes the step of sending a further excitation signal to a second of the capacitive plates and measuring the capacitance through the first of the capacitive plates.

* * * * *